Patented Feb. 20, 1945

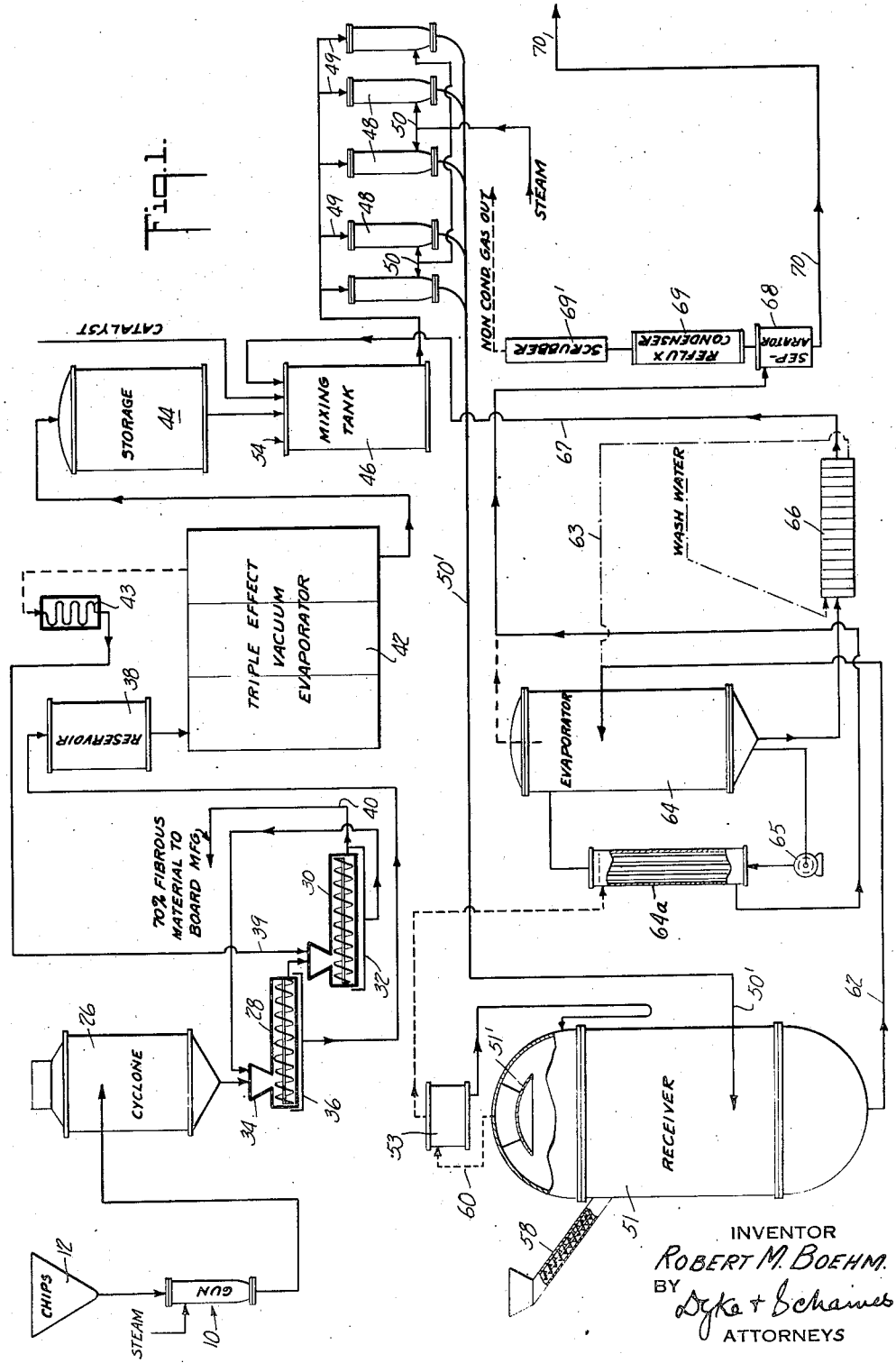

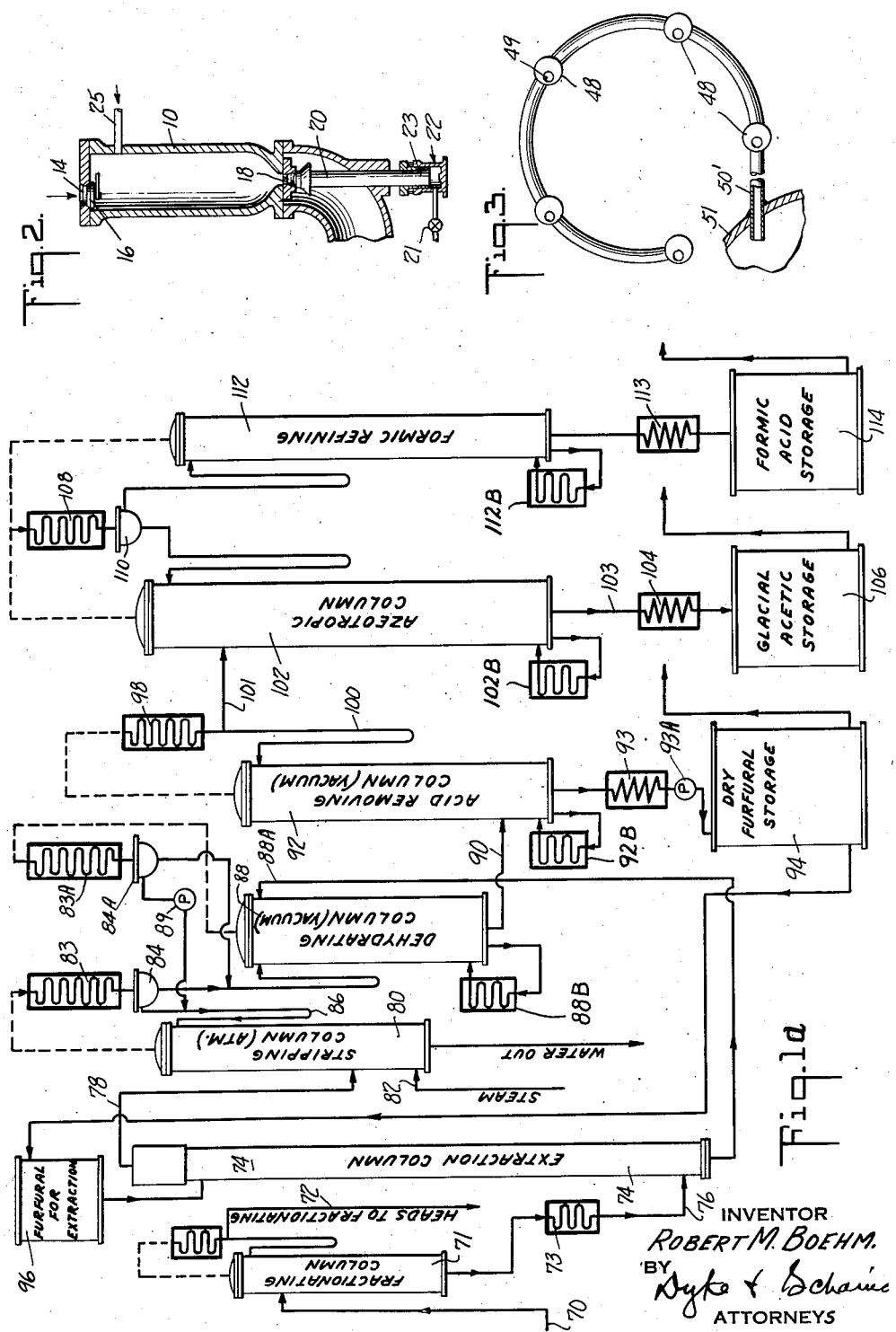

2,369,655

UNITED STATES PATENT OFFICE 2,369,655

PROCESS OF MAKING FURFURAL AND FATTY ACIDS

Robert M. Boehm, Laurel, Miss., assignor to Masonite Corporation, Laurel, Miss., a corporation of Delaware Application August 13, 1940, Serial No. 352,399

20 Claims. (Cl. 260—347)

The invention relates to the manufacture of furfural, organic acids and other chemical products, and relates more especially to manufacture of such products from originally water-insoluble constituents of hard vegetable material made soluble or dispersible or suspendible in water by subjection of the wood or woody material to high heat and pressure in presence of moisture.

In practicing the invention, various kinds of hard vegetable materials may be made use of, such as wood of trees and hard material of annual growths such as bamboo, cane, cornstalks, corncobs, peanut and cotton-seed hulls, oat hulls, and the like. Wood is the preferred material, and use and treatment of wood of trees will be described in order to provide an illustrative embodiment affording an understanding of the invention.

Such production of water solubles—which term will be used to include all materials produced from the wood by such treatment and taken up by water, whether in a state of solution, dispersion or suspension—has heretofore taken place as an incident to the preparation of solid material for manufacture of board etc. products subjecting wood chips to the action of high pressure steam and then disintegrating the material by explosive discharge from the region of high steam pressure. The presence of the water solubles so incidentally produced was detrimental to the board etc. products, and in making boards and the like of the solid material, washing thereof was resorted to for reduction of the water solubles, which were washed out in part and lost with the waste water.

My application Ser. No. 113,607, filed December 1, 1936, issued as Patent No. 2,224,135, December 10, 1940, discloses and claims elimination of the washing out of such water solubles and of the resulting waste thereof, by the substitution for such washing of an expression treatment for recovery and saving of the water solubles, whereby to improve the making of board etc. products and to secure a liquor or juice containing expressed water solubles, which constitute a chemical base material for use in production of furfural and various other chemicals, and for production of products from the sugars etc. by fermentation and the like treatments.

The present invention relates to the making of furfural, organic acids and other chemical products from materials containing pentosans and the like, and preferably to making such products from the water soluble or chemical base material expressed from wood which has been subjected to high heat and pressure in presence of moisture, for example as described in my prior patent above referred to.

One object of the invention is the provision of a new process for making furfural from materials containing pentosans.

Another object is the provision of a new process for making furfural, organic acids and other chemicals from the water solubles produced by transformation to solubility of some of the originally insoluble parts of wood by subjection to high heat and pressure in presence of moisture, and preferably to the action of steam under high pressure.

A further object consists in the provision of a process for the rapid production of furfural, organic acids, etc. from such water solubles wherein the water solubles are subjected to a high temperature treatment with steam closely resembling the treatment previously applied to the wood itself in producing the water solubles.

A further object consists in providing process steps for making furfural, organic acids, etc. from such water solubles, wherein the tarry materials that are formed are separated out and recovered at an early stage of the process, and in such manner and state that stickiness and hard caking of these tarry materials are avoided, and they do not act to prevent the securing of good yields of furfural, fatty acids, etc.

A further object is the provision of catalytic agents serving to materially increase the yield of furfural and organic acid obtained, and particularly adapted for use with water solubles obtained from wood by treatment with high heat and pressure in presence of moisture.

A further object is the provision of a process in which finely divided solids having sorptive properties are provided, on which the tarry materials produced from the water solubles can collect or condense, and stickiness and caking of the tarry materials can be thereby avoided, while also withdrawing and recovering furfural formed to keep it from acting as a plasticizing agent which would impart sticky and caking characteristics to such tarry materials, and until the tarry materials are separated out the liquor containing same is kept in a state of vigorous agitation.

A further object is the provision of an improved process for making furfural and organic acids from water solubles secured from wood wherein furfural is made use of as an extracting agent for the acids.

Other objects will appear or be pointed out.

In the accompanying drawings, Figs. 1 and 1a are successive parts of a flow sheet indicating diagrammatically the preferred steps for making furfural, organic acids, etc., in accordance with the present invention, and also indicating the preliminary steps involved in the making, expressing, and collecting of the water solubles or chemical base material utilized. Fig. 2 is a vertical sectional view of a gun. Fig. 3 is a plan view of a plural gun arrangement.

Reference character 10 designates a gun for the shooting of wood chips supplied from a hopper 12. The gun 10, as shown in detail in Fig. 2, has a charging port 14 equipped with an outward closing valve 16. Its outlet 18, which is normally closed by a hydraulic valve 20, can be opened by opening a valve 21 in the small hydraulic cylinder 22 permitting the ram 23 to be depressed and the gun valve 20 to open in response to the pressure in gun 10. The steam supply to the gun is indicated at 25.

The exploded material from gun 10 passes tangentially into the cyclone separator 26, from which the steam escapes to the atmosphere. The fine solid material produced falls into the screw expeller 28, in which it is subjected to an expression treatment. The solid material can be again subjected to expression by a second screw expeller 30. The number of expeller screws in tandem and/or in parallel arrangement can be varied as desired. As shown, the liquor from screw 30 passes to pan 32 from which it is led back or recycled to the hopper 34 leading to the first screw 28, and the combined liquor from screws 28 and 30 passes to pan 36 from which it goes to the reservoir 38. In order to secure an improved yield of the juice containing water solubles, condensate from evaporation of such liquor as later described may be supplied to the expression operation or operations, preferably to the material passing to screw 30 as indicated at 39.

The solids remaining after the reduction of water soluble content by expression treatment are routed away as indicated at 40 to be used for board manufacture or for other purposes.

For the manufacture of products from the water solubles by the steps presently to be described, a more highly concentrated liquor can be used to best advantage. As here shown, the expressed liquor in which the solid content does not ordinarily exceed about 20%, is concentrated to contain preferably about 50% or more of water solubles or solids. This can be accomplished by an evaporator 42, preferably of the multiple effect type, from whence the concentrated liquor goes to the storage tank 44. Should this material be subject to dilution by bringing back recycled materials or the like, this dilution can be compensated for by evaporating at 42 to a higher concentration as for example 60% solids, to be later diluted back to, say, 50% solids. Some of the water which is evaporated and contains organic acids, etc., can be condensed, as by a condenser 43, and recycled to the expression screws as indicated at 39. Alternatively, vapors from the evaporator may be passed through a column (not shown) filled with limestone whereby the acids are neutralized and recovered as calcium acetate and calcium formate, the steam being permitted to escape. A still further alternative (also not shown) may consist in passing these vapors through a carbon scrubber to adsorb these acids which can be recovered from the carbon.

The treatment for making furfural etc. is largely dependent upon the properties of the juice or chemical base material used therefor. These properties can best be understood from a typical example of the making thereof, and the hardwood, gumwood, will be selected for illustration as affording a preferable chemical base material.

In such a typical operation, gum wood chips are charged into a gun such as shown in U. S. patent to Mason, No. 1,824,221, the steam pressure raised to 1000 lbs. per sq. in. in 30 seconds, then held at that pressure for 2 or 3 seconds and the gun contents then exploded by discharge from the region of high pressure.

The transformation of the water-insoluble wood produces three different kinds of material from the wood. Approximately 13% of the dry weight of wood (which will be used as the basis of percentage figures), is converted into volatiles. At present, these are lost with the escaping steam. Approximately 20% of the dry weight of wood is converted to water solubles, which can be washed out by water. The expressing operation removes about 17% of these water solubles. About 70% remains, consisting of approximately 67% of water insoluble material together with about 3% of water solubles which were not removed by the expression treatment. This portion is usable for making board and the like products. Of these materials, the expressible water soluble part of approximately 17% is of present special interest. and supplies the material for use with the present invention.

The expressed liquor contains this 17% of solid water-solubles with approximately four times their weight of water and is of approximately 1.06 specific gravity and of a light tan color, and is ordinarily opaque due to the presence of colloidally dispersed material. This liquor is preferably evaporated down to contain as much or more solids than water. In this evaporation treatment, volatiles are lost with escaping water vapor, but this loss can be minimized by condensing and recycling at 39 some of the water with materials carried thereby to use in juice expression, or the volatile materials, principally acids, can be recovered with lime or charcoal or in other ways, as explained above. Thus the water solubles lost in evaporation can be held down to about 1% or less of the dry weight of the original wood; and the concentrated liquor may contain water soluble solids amounting to approximately 16% by weight of the original wood and about an equal amount or less of water.

Taking now this total water-soluble solid content of the expressed and concentrated liquor, which constitutes approximately 16% by dry weight of the original wood, and calling such total quantity of solids 100%, the following can be said of its makeup.

Approximately 60% consists of sugars and materials which can be converted into sugars. Of these approximately 57% consist of polysaccharides and the remaining approximately 3% of free sugars. With use of gum wood about 50% out of the 60% consists of pentosans, as xylan and araban, etc., and free pentose sugars, as xylose, arabinose, etc., and the remaining approximately 10% consists of hexosans, as mannan, galactan, glucosan, etc., and of free hexose sugars, as mannose, galactose, glucose, etc. This content of polysaccharides and sugars is believed to be produced by an acid hydrolysis of hemicellulose and freeing of polysaccharide material from combinations which held it water-insoluble in the wood. While the free volatile organic acids produced are partly lost in evaporation of water from the liquor carried out for the concentration thereof, about 20% of organic acids and salts thereof are retained in the evaporated and concentrated liquor.

The liquor responds to tests for lignin, thus indicating that lignin or materials made from the lignin in the wod are contained therein.

Approximately 20% of the water solubles consist of tarry materials, or materials which can be extracted from the liquor with butyl alcohol and the like solvents and remain as a tarry residue when the extract is evaporated down. These tarry materials appear to give the liquor its light tan color. However, in the liquor before and after concentration the tars do not exhibit stickiness or tendency to coat or cake on vessels and apparatus, and the liquor can be readily concentrated, without trouble from the tars. In the case of liquor made from pine suspended or dispersed materials are present. The above statement of contents of the water solubles of such liquors is not intended to be complete, but only to identify the main constituents so far as practicable. In addition traces of furfural and levulinic acid and propionic acid are identifiable in such liquor, and many other materials are doubtless present in small proportions.

The percentage of volatile organic acids or salts thereof in the liquor can be increased if, prior to the treatment with high heat and pressure in presence of moisture preferably carried out with high pressure steam, the chips are impregnated with about 5% by weight of neutralizing or buffering material, such as sodium sulphite or soda ash, as in this case more of these volatile acids are fixed in the form of salts, and losses thereof with the escaping stem upon explosion and upon evaporation of the expressed liquor are minimized.

Hardwood is preferable, since with soft woods, such as Pinus palustris for example, the pentosan-pentose content of the juice and the hexosan-hexose content thereof are ordinarily approximately equal, and with mixtures of soft and hard wood these proportions can be varied as desired. Lower pressures than 1000 lbs., as 300 lbs. per sq. in. with longer times and higher pressures as 1200 lbs. per sq. in. for shorter times, can be used for chip shooting if desired.

It has been found that upon substantially any ordinary cooking or like treatment of the liquor containing water solubles to make furfural, etc., products, tarry material is formed in a proportion greatly exceeding that in which tar was present in the juice, and further that, unlike the tar in the juice, this tarry material, particularly when it contains furfural, which appears to act as a plasticizer of the tar, is sticky and forms hard deposits. This may be accounted for at least in part by conversion of hexosans and/or hexose into a tarry or cake-like state. The cooking of the liquor for several hours at moderate pressures such as 60 lbs. per sq. in., or on much higher temperature treatment thereof while passing through heated pipe coils and the like, although giving good yields of furfural etc. for a time, will result in the heated walls of the apparatus exposed to the liquor becoming coated with a hard tar-like deposit which interferes with efficient operation. In such treatments catalytic or reaction agents such as hereinafter described are made use of.

The above difficulties are overcome by the present invention as will hereinafter appear.

The reaction for making furfural, organic acids, etc. is preferably accomplished as indicated in the drawings by use of a gun or guns 48 similar to the chip shooting gun 10, but preferably of smaller capacity. The guns 48 are preferably provided with hydraulic outlet valves similar to valve 20 of gun 10. With use of such guns, the reactions productive of furfural, organic acids, and the like products are effected by use of live high temperature steam, and the reactions are carried out with high rapidity and in such manner that the walls of the reaction chamber and passages therefrom are kept free from tarry and the like deposits by shooting the gun contents out of the gun chamber and through the outlet passages at high speed by the explosion ensuing upon opening up of the gun discharge valve.

The preferable arrangement in this connection consists in the provision of a battery of such guns 48, five being indicated in the drawings, each having a top inlet 49 for pumping in the concentrated liquor and a bottom inlet 50 for the high pressure steam. These guns may discharge through a manifold 50' tangentially into the large receiver 51. By using plural guns 48 exploded in succession some superatmospheric pressure can be maintained in the big vessel 51, and a substantially continuous operation can be effected if desired. The operation of the guns can be automatic or manual as may be desired.

Preparatory to treatment of the preferably concentrated liquor for making furfural, etc., a small proportion of material is preferably incorporated therewith to serve substantially the purpose of a catalytic or reaction agent or agents. This material is preferably admixed with the liquor in the tank 46 to which the liquor is supplied from the storage tank 44 as needed, and delivered from tank 46 to the guns 48. A small percentage of sulfuric acid of 1.84 specific gravity, as about 3% of the weight of the water solubles in the liquor, together with a smaller percentage as about 0.2–0.4% of aluminum sulfate

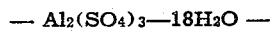

— $Al_2(SO_4)_3—18H_2O$ — serves effectively for this purpose and gives best yields of furfural etc. and is the preferred catalyst. However other catalytic or reaction agents, as calcium metaphosphate, phosphoric acid and magnesium sulfate, may be used and in varying amounts, particularly where the treatment is modified from that given herein.

For shooting to make furfural, organic acids, etc., the prepared liquor from the feeding and mixing tank 46 is pumped into a gun 48. In addition to the catalytic material, finely divided material, such as clay, carbon or other inert material, is preferably added to this material, preferably by introduction into the mixing tank 46 as indicated at 54, and is useful for avoiding depositing and caking of tarry materials throughout the apparatus. Instead of adding in the mixing tank, the addition of these finely divided materials may be made directly to the material in the gun chamber if desired.

Thereupon steam is supplied to the gun at high pressure, preferably about 800–1000 lbs. per sq. in., and is preferably admitted at the bottom of the gun chamber so as to pass upward through the liquor in the gun chamber to thereby get maximum agitation and contact therewith. After bringing the pressure in the gun up to this pressure, it is held for a time depending on the quantity of the juice introduced into the gun, and size of gun. For example, when using steam at about 1000 lbs. per sq. in. and with about four gallons of the concentrated juice in a gun chamber of about eight gallons total capacity, time for bringing up to pressure and holding at pressure may be about 10 to 15 seconds. The outer valve from the gun 48 is then opened and the contents explosively discharged into the big receiver 51, entering at high velocity and producing great agitation therein. A false pressure, in excess of the steam pressure applied, may quickly build up in the gun, and is apparently due to rapid production of volatile materials, gases, etc. Provision (not shown) may be made for venting these vapors from the top of the gun 48 to the receiver 51, and improved yields of furfural and of acids can be obtained by making such provision. Formic acid is found to be comparatively easily decomposed by holding the materials at high pressures and temperatures for an unduly long time, and for this reason a shooting pressure not exceeding about 800 lbs. per sq. in. is preferred, with a holding time about as described for 1000 lbs. per sq. in. or slightly longer.

As an alternative for or in addition to supplying fine material for condensation of tars etc. elsewhere, the tar collecting or condensing agent may be admixed with material coming to receiver 51 from the gun, and this material or some thereof is preferably supplied to the receiver 51. A pugging screw 58 is shown for discharging damp stiff clay into receiver 51 for this purpose. Other fine materials such as waste sludge from fiber board manufacture, or other finely divided wood fiber materials can be introduced into the receiver 51 and/or if desired, introduced into the evaporators 64 to be described later, and mixed with the shot material from guns 48. Only a small percentage of such fine material is added, as approximately 2-5% and it is finely divided and can be readily pumped, etc.

In the treatment in the gun 48 of liquor containing water solubles and made from gum wood chips for example, followed by explosion, approximately two-thirds of the water soluble solids are converted to volatile material. This volatile material comprises furfural and volatile organic acids, principally acetic and formic acids, together with other condensible and non-condensible materials. The furfural appears to be made at least principally from the pentosan-pentose content of the water solubles. The remainder in liquid state and containing the tarry materials, hot water with furfural and fatty acids in solution, catalysts, etc., falls to the bottom of receiver 51. The tarry content is considerable, as already stated, part of it appearing to be a modified form of the non-sticky tars present in the juice taken for treatment and part of it apparently made from hexosans or hexoses or parts of pentosan-pentose which are not converted to furfural, and parts from still other materials present. The proportion of volatile organic acid material produced is many times higher than the amount in the water solubles taken for treatment.

On discharge of the hot material from guns 48 into the receiver 51, partial separation of volatiles from the tarry material takes place, the vapors of furfural and volatile organic acids and much of the water flashing off and being removed through an outlet passage 69 at the top of receiver 51. Baffles as 51' can be provided in receiver 51 and the vapors passed through a foam trap 53. These serve to keep the issuing vapors from carrying entrained matter along with them. This vaporous material is hot and this heat can be utilized, for example to effect vaporization of the furfural, volatile organic acids, etc., in the liquor which is discharged through the outlet 62 at the bottom of the receiver 51, and obtain separation thereof from the tarry, etc. materials also contained in such liquor.

As shown, the liquor from outlet 62 of receiver 51, is evaporated, and furfural, volatile organic acids, water, and the like, taken off as vapor in an evaporation apparatus 64 to which heat is supplied by the flash vapors from the top of receiver 51. A heat exchange unit 64a may be conveniently inserted into the system to transfer heat from the hot gases flowing from the receiver to aid in evaporation occurring in the evaporator 64. This evaporator is of such character that the material is kept in a state of vigorous agitation during the separation of the furfural, acids and other vaporizable material from the tarry material. An evaporator or evaporators of the calandria type is preferred in which the contents are kept in rapid circulation and agitation by means of the circulatory pump 65. One evaporator unit is indicated for simplicity of showing but more can be used, as for example multiple effect evaporators, and these may be operated under partial vacuum, etc. Withdrawal of the vapors of furfural from the liquid while in agitated state is of assistance in preventing plasticizing action of furfural upon the tarry materials.

The heavier material such as the tarry material from the bottom of the evaporator can advantageously be recovered separately practically free from furfural and the like as by means of filter presses or the like. In the present showing this is done by filter press 66 to which the residual material is passed from the evaporator. Continuous filter presses may be used if desired in order to operate the process continuously. With use of sorbent materials as above described the mixtures thereof with the tar as delivered to the filter press are of a substantially granular character and quite free from stickiness and caking.

The filtered liquor can advantageously be recycled, at least in part, to be again supplied to and treated in guns 48, as by delivery to the feed and mixing tank 46 therefor, and this recycling is indicated at 67. This recycled material contains pentosans, etc. Such recycling returns most of the agents used for catalysts, reduces the requirements for catalytic material, and serves to increase the yields of products as furfural, volatile acids, etc. As already stated, if such recycling tends to dilute the material in the feeding tank 46, this can be compensated for by additional evaporation of the juice before delivery to tank 46. The filter cakes can be subjected to distillation treatment for recovery of condensible materials and if desired can be calcined for recovery and reuse of the clay or other inert inorganic contents. If the filter cakes are washed the wash water may be delivered to evaporator 64 as indicated by broken lines at 63. Dotted lines in the drawings indicate passages containing gaseous material or vapor, and full lines indicate passages for liquid material. From the tars a great variety of materials can be secured. For example, by extraction of the tars with ether, levulinic acid may be recovered.

The vapors from evaporators 64 are combined with the flash vapors from receiver 51, after the latter have been used for supplying heat to evaporator 64, and are condensed at 69, and the condensate passed on at 70 is treated for recovery and separation of the products as furfural, etc.

The vapors passing through the condenser 69 are preferably scrubbed as indicated at 69', and the non-condensible gases then vented to the atmosphere.

Preferably the first treatment for effecting recovery consists in removal of the low boiling materials or heads such as acetone, methanol, etc., which are formed, and these may be recovered as by means of fractionating column 71, from which they are taken away as indicated at 72 for further fractionation. This quantity is small and its further fractionation etc. treatment is not shown but will be readily understood.

After removal of the heads, the liquor containing principally water, furfural and volatile organic acids is subjected to treatment for extraction of the acids. Furfural being already present in the material to be treated and being available from this manufacture, and being found to be a good material for extraction of the organic acids, is preferably made use of for this purpose. Other extraction agents as ethyl acetate, isopropyl ether, butyl alcohol, etc., can be used if desired, but would require recovery separate from the furfural. An extraction column 74 is indicated for this purpose, and after cooling as indicated at 73, the liquor with the heads removed is supplied at the bottom of the extraction column 74 at 76, and dry furfural supplied at the top as at 96, and the desired separation effected by counter-current flow. The material from the top of extraction column 74 contains largely water and dissolved furfural substantially free from acids, and that from the bottom of the extractor 74 is mainly furfural, with dissolved water and acids.

The water and furfural from the top of the extraction column 74 is led at 78 to the stripping column 80, to the lower part of which steam is supplied as indicated at 82. Water is discharged to the sewer from the bottom of stripping column 80, or reused in the board-making process.

The vapors of furfural and water from the top of the stripping column 80 are condensed at 83 and led to decanter 84. The upper layer from the decanter 84 and containing mostly water (about 92%) is returned to the stripping column 80 as indicated at 86. The lower layer, containing mostly furfural (about 92%), is run to the vacuum dehydrating column 88.

The furfural and acid mixture, also containing water, from the bottom of the extracting column 74 is conducted to the vacuum dehydrating column 88 at 88A whereby it is dehydrated. Furfural and water vapors from the top of the vacuum dehydrating column 88 are condensed at 83A and led to decanter 84A. The bottom layer from the decanter 84A containing about 92% furfural and 8% water is recycled to the vacuum dehydrating column 88, preferably jointly with the like material from the decanter 84. The upper layer in decanter 84A, containing mostly water (about 92%) is run through pump 89 to the stripping column 80. Separate condensers 83 and 83A are made use of because the stripping column 80 operates at atmospheric pressure whereas the dehydrating column 88 operates under vacuum.

The furfural-acid mixture from the bottom of dehydrating column 88 is sent as indicated at 90 to the vacuum acid removing column 92, from the bottom of which dry furfural is obtained and, after cooling as indicated at 93, is pumped at 93A to furfural storage tank 94. Part of the furfural is sent from tank 94 to tank 96 to supply furfural to the extraction column 74, and the balance, after being preferably further refined, is product furfural.

The mixture of acid vapors, principally acetic and formic acids, from the top of acid removing column 92 is condensed as at 98 and recycled in part to the acid removing column 92 as indicated at 100, and in part sent at 101 to the azeotropic column 102 in which the acetic and formic acids are separated, the glacial acetic acid product being run off from the bottom of column 102 as indicated at 103, and after cooling at 104 sent to storage tank 106. The recovery of these acids separately is desirable because of the relatively high proportion of formic acid produced.

The vapors of formic acid and of the azeotropic removing agent for formic acid, such as thiophene, ethylene dichloride or other azeotropes, coming from the top of the column 102 are condensed by condenser 108 and sent to decanter 110. The lower layer containing most of the removing agent is recycled from the decanter 110 to the azeotropic column 102, and the upper layer consisting of formic acid is sent to a column 112 for the refining of the formic acid. The refined acid after being cooled as indicated at 113 is sent to product storage tank 114. To fully complete the separation of the removing agent from the formic acid the combined vapors from the top of the formic acid refining column 112 are returned to condenser 108, and the content of formic acid removing agent back to the azeotropic column 102 with other material constituting the lower layer in the decanter 110.

Typical yields from water solubles made from gum wood as above described are approximately 18%-25% of furfural, based on the weight of the water solubles, approximately 12-15% of acetic acid, and approximately 6-8% of formic acid, on the same basis.

Provision (not shown) is of course made for final refining of dry furfural, and other routine procedures. While for simplicity separate heating appliances are shown for the various columns and the like, it will be understood that heat from any available source may be used, on the ordinary basis of having heat interchangers wherever practicable.

I claim:

1. Process of producing furfural from pentosans, which comprises exposing a charge containing pentosans with a furfural-forming acid catalyst in a closed chamber to steam at high pressure and corresponding high temperature whereby furfural is produced from the pentosans, suddenly discharging the steam-treated charge under the high pressure of the steam into a receiver having reduced pressure, subjecting the unvaporized discharged materials to flash evaporation in the receiver at the lower pressure therein, removing furfural as vapor, and condensing and recovering the furfural.

2. Process of producing furfural from pentosans as described in claim 1, and wherein the steam pressure in the closed chamber prior to discharge is approximately 800 to 1000 pounds per square inch.

3. Process of producing furfural from pentosans as described in claim 1, and wherein the furfural-forming acid catalyst comprises sulfuric acid and alum.

4. Process of producing furfural from pentosans, which comprises exposing a charge containing pentosans, together with other vegetable materials which upon being subjected to high-pressure steam tend to form tars which are of such character as to be susceptible of being plasticized and made sticky by furfural, with a furfural-forming acid catalyst in a closed chamber to steam at high pressure and corresponding high temperature. whereby furfural is produced and also tars of the stated character, suddenly discharging the entire reaction mixture under the high pressure of the steam into a receiver having reduced pressure, subjecting the unvaporized discharged materials to flash evaporation at the lower pressure therein, removing furfural rapidly as vapor thus avoiding substantial plasticization of the tars by furfural, and condensing and recovering the furfural.

5. Process of producing furfural from pentosans as described in claim 4, and wherein finely divided inert material is supplied to convert the tars produced to a substantially granular state.

6. Process of making furfural, which comprises subjecting in a closed chamber a charge containing pentosans, together with other vegetable materials which when subjected to high pressure steam tend to form tars which are susceptible of being plasticized by furfural, with a furfural-forming catalyst to steam at high pressure and temperature, suddenly discharging the contents of the chamber into a receiving vessel having reduced pressure wherein unvaporized reaction products are subjected to flash evaporation, removing furfural vapors from the chamber whereby plasticization of the tars by such part of the furfural is avoided, incorporating finely divided inert material with the layer of liquid furfural, tars, and the like which remain at the bottom of the vessel whereby the tars and finely divided material are agglomerated into granular material, removing such granular material, and collecting and recovering both the vaporous and the liquid furfural.

7. Process of making furfural, which comprises subjecting a charge containing pentosan material and normally non-caking tarry material to high heat and pressure in the presence of a furfural-forming catalyst, whereby furfural is produced together with caky tars, introducing a minor proportion of finely divided inert material into the reaction mixture whereby to convert the tars produced to substantially granular state, and recovering the furfural.

8. Process as in claim 7, and wherein the furfural-forming catalyst comprises sulfuric acid and alum and the proportion of finely divided inert material is approximately 2% to 5%.

9. Process of making furfural and organic acids, which comprises subjecting a charge containing pentosan material and normally non-caking tarry material to the action of steam at high temperature and pressure in a reaction zone in the presence of a furfural-forming catalyst, whereby furfural and organic acids are produced and the tarry material is converted to caky tars, introducing a minor proportion of finely divided inert material to the steam treated materials, whereby to convert the tars produced to substantially granular state, vaporizing the furfural and volatile organic acids and recovering the furfural and organic acids.

10. Process as in claim 9, and wherein the granular tar material is removed from the reaction zone.

11. Process as in claim 9, and wherein the furfural-forming catalyst comprises sulfuric acid and alum and the proportion of finely divided inert material is approximately 2% to 5%.

12. Process of making furfural comprising the steps of subjecting a liquor containing pentosan material and normally non-caking tars to high heat and pressure in the presence of a furfural-forming catalyst to thereby obtain a conversion of the pentosan material to furfural accompanied, however, by conversion of the normally non-caking tars to tars which of themselves would be of caky nature and upon which furfural would have a plasticizing effect, introducing into the reaction mixture a finely subdivided substantially inert material adapted to take up said caky tars by sorptive action and form therewith an agglomerated granular material, and subjecting the reacted mixture to evaporation at lower pressure under agitation thereby removing furfural rapidly as vapor and avoiding plasticization of the caky tars by furfural, and recovering the furfural.

13. Process of making furfural and organic acids from liquor expressed from heat-treated wood, which comprises the steps of subjecting such liquor to high temperature and pressure in the presence of a furfural-forming catalyst in a reaction zone whereby furfural and organic acids are produced, together with caky tars, including in the reaction zone a minor proportion of finely divided inert material adapted to adsorb and absorb said tars, removing from the reaction zone the reaction products including the tars together with said inert finely divided material, and separately recovering the furfural and organic acids.

14. Process of making furfural and organic acids from liquor expressed from wood after subjection of the wood to high temperature and pressure in the presence of moisture, which comprises subjecting such liquor to the action of high-pressure high-temperature steam in a closed vessel, suddenly discharging the vessel contents into a receiver at much lower pressure, separating the resulting vaporous and liquid material, incorporating inert finely subdivided material with the liquid portion, evaporating down such liquid portion, removing therefrom such inert material with other material taken up thereby, combining the vaporized materials from the receiver with the material evaporated from such liquid portion, condensing the combined vapors, extracting furfural and organic acids from the condensate by counter flow with new furfural, and recovering organic acids from the furfural-extracted material.

15. The process of producing furfural and organic acids from liquors containing pentosans and other vegetable extractives derived from the treatment of wood fiber with steam under heat and pressure, which comprises concentrating such liquors to a high content of dissolved solids, charging the concentrated liquor into a closed reaction chamber with a furfural-producing catalyst, charging steam at high temperature and pressure into such reaction chamber to build up rapidly high temperature and pressure therein, and maintaining such temperature and pressure for a sustained period of time to produce furfural in the charge together with some production of tars, rapidly blowing out the contents of the reaction chamber including the tars formed in the reaction into a flash chamber at lower pressure, whereby the mixture is subjected to evaporation and agitation at the reduced pressure, removing vaporized furfural rapidly from said flash chamber, thus avoiding substantial plasticization of the tars by furfural, and condensing and recovering the furfural.

16. The process of claim 15, and wherein a minor proportion of inert material capable of agglomerating and preventing the caking of the tars is provided in the reacted liquor subjected to vapor separation at reduced pressure.

17. The process of producing furfural and organic acids from pentosan-containing liquors derived from the treatment of wood fiber with steam under heat and pressure, which comprises concentrating such liquors to at least about 50% solids, introducing such liquor with an acid furfural-forming catalyst into a closed reaction chamber, introducing high pressure steam into said reaction chamber, to bring its contents rapidly to a pressure of approximately 800 to 1000 pounds per square inch and a corresponding temperature to effect conversion of pentosans to furfural therein together with some tar formation, and suddenly discharging the contents of the chamber into a reduced pressure chamber, the tars formed in the reaction being carried with the contents of the reaction chamber.

18. The process of claim 17, and wherein a minor proportion of inert material capable of agglomerating the tars formed in the reaction is incorporated in the liquor in the reaction chamber.

19. The process of producing furfural from concentrated pentosan-containing liquors which comprises successively introducing charges of such liquor together with acid furfural-forming catalyst into a plurality of close reaction chambers, successively introducing high pressure steam into said reaction chambers to bring their contents rapidly to high pressure and temperature and effect conversion of the pentosan material to furfural therein accompanied by formation of tars, suddenly discharging the reaction contents of said chambers in succession into a flash chamber in which separation of vapors and unvaporized liquor takes place, and continuously passing the unvaporized liquors from said flash chamber to an evaporator in which furfural and other volatile products of reaction are separated from the tars formed in the reaction.

20. The process of claim 19 wherein a minor proportion of inert adsorptive material is provided in the liquors discharged from the reaction chambers to be present during vaporization of the furfural and other volatile products of reaction, to agglomerate and prevent caking of the tars.

ROBERT M. BOEHM.